Nov. 11, 1924.
R. W. PETERSON
1,515,441
PORTABLE AUGER FOR POSTHOLES
Filed Aug. 20, 1923
3 Sheets-Sheet 1
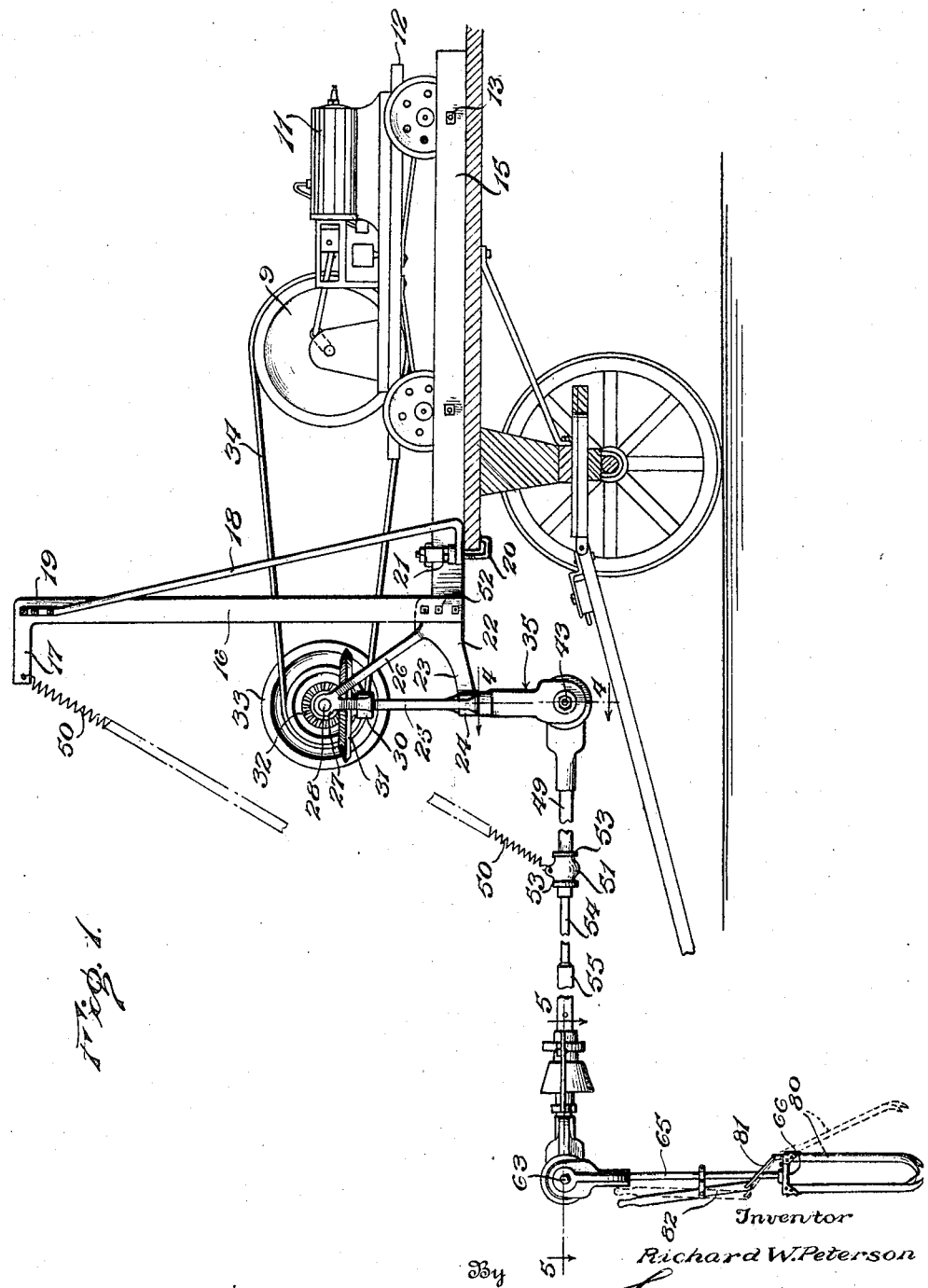
Inventor
Richard W. Peterson
By
Larry Racey, Attorneys Nov. 11, 1924.  
R. W. PETERSON  
PORTABLE AUGER FOR POSTHOLES  
Filed Aug. 20, 1923
1,515,441
3 Sheets-Sheet 2
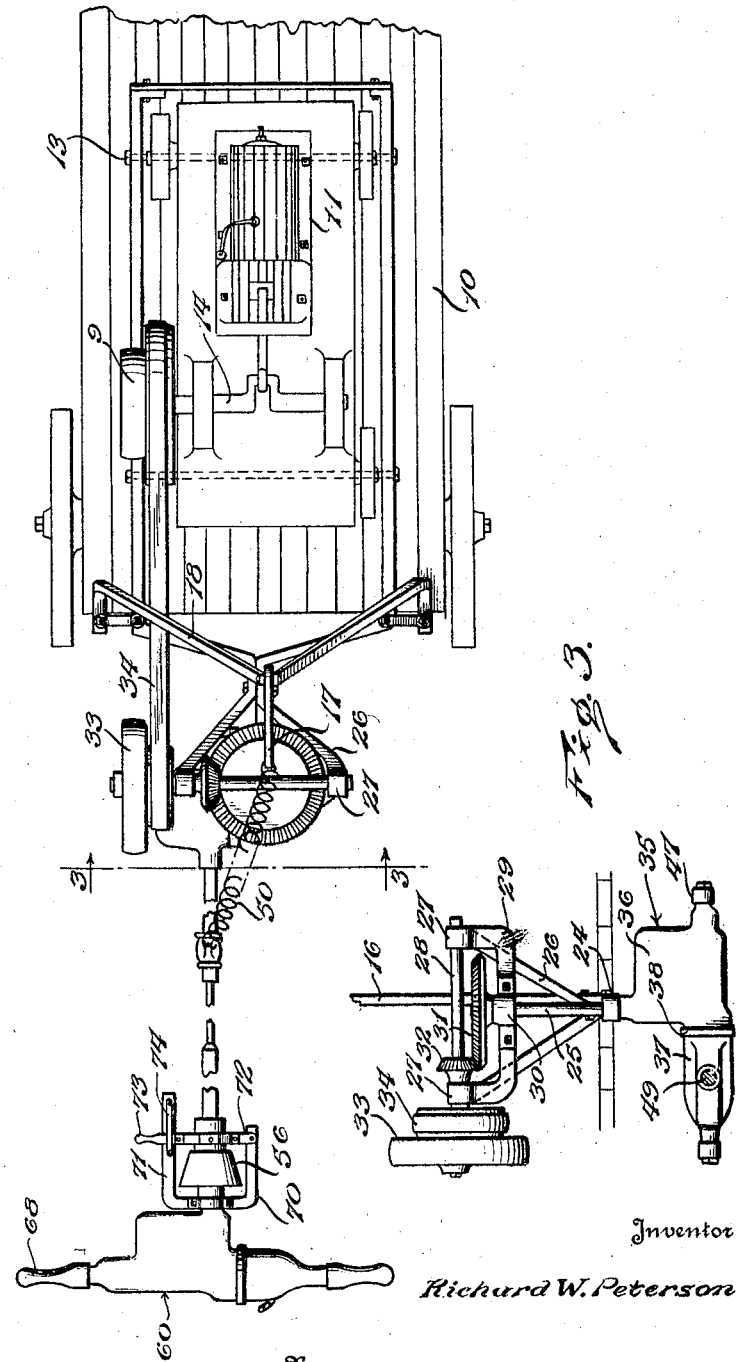
Inventor  
Richard W. Peterson  
By  
Lacy & Lacey, Attorneys Nov. 11, 1924.
R. W. PETERSON
PORTABLE AUGER FOR POSTHOLES
Filed Aug. 20 1923
1,515,441
3 Sheets-Sheet 3
Fig. 4.
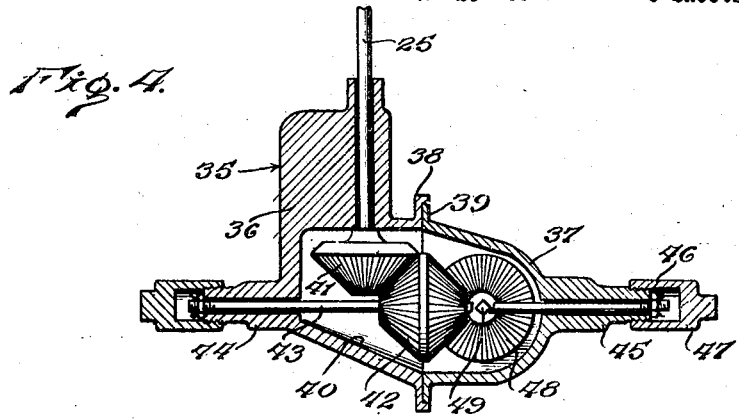
Fig. 5.
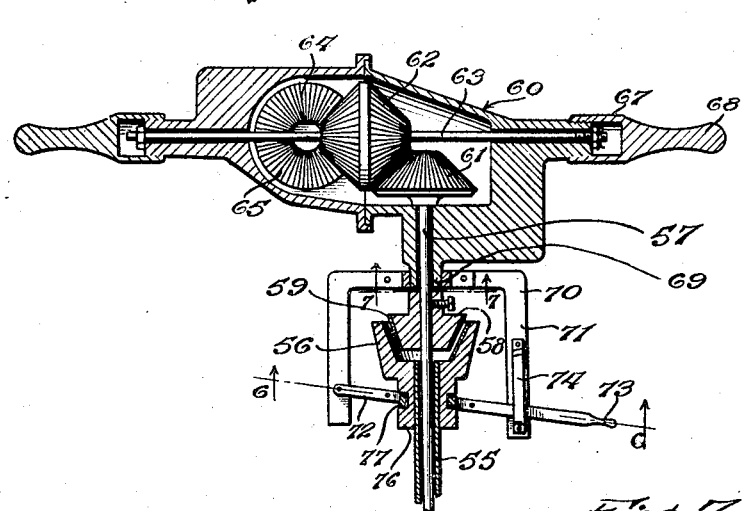
Fig. 6.
Fig. 7.
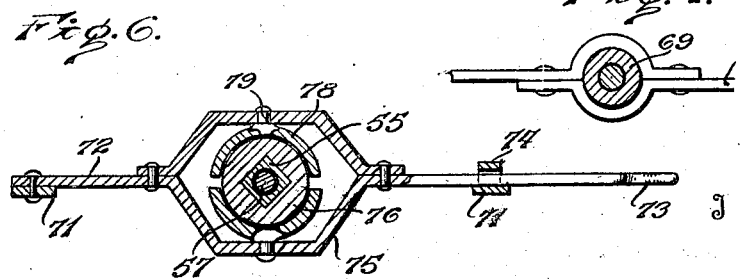
Richard W. Pet
By
Lacey & Lacey, Patented Nov. 11, 1924.

1,515,441

UNITED STATES PATENT OFFICE.

RICHARD W. PETERSON, OF CERESCO, NEBRASKA.

PORTABLE AUGER FOR POSTHOLES.

Application filed August 20, 1923. Serial No. 658,398.

*To all whom it may concern:*

Be it known that I, RICHARD W. PETERSON, a citizen of the United States, residing at Ceresco, in the county of Saunders and State of Nebraska, have invented certain new and useful Improvements in Portable Augers for Postholes, of which the following is a specification.

The present invention relates to a posthole auger mounted in such a manner that it can be easily transported from one place to another.

The main object of the invention is to provide an auger for boring holes in the ground for telegraph and telephone poles, which has a wide range of adjustments and is easy to operate.

In the accompanying drawings, one embodiment of the invention is illustrated; and—

Figure 1 shows a side elevation partly in section of the auger mounted on a truck together with a motor for driving the same;

Figure 2 is a top plan view of Figure 1;

Figure 3 is a section along line 3—3 of Figure 2;

Figure 4 is a vertical section along line 4—4 of Figure 1;

Figure 5 is a horizontal section along line 5—5 of Figure 1;

Figure 6 is a transverse section along line 6—6 of Figure 5; and

Figure 7 is a fragmentary section along line 7—7 of Figure 5.

In the drawings reference numeral 10 represents a truck preferably having a flat bottom or floor, upon which is deposited a motor 11 such as a gas engine. This motor is preferably mounted on a small wheeled carriage 12 anchored on the truck by bolts 13 or the like so as to form a rigid connection therewith. The main shaft 14 of the motor carries a two-stage pulley 9 for driving the auger and giving it different speeds.

On the floor of the truck is placed a frame 15 preferably constructed of flat bars extending forwardly of the motor and slightly beyond the same. This end of the frame carries an upright 16 terminating with a forwardly directed arm 17 at the top. The upright is braced by two bars 18 bolted to the top of the upright as at 19, and secured to the floor of the truck by hook bolts 20, and the forward end of the frame 15 is secured in a like manner as at 21 to the floor of the truck. The brace bars 18 are inclined to the rear from the upright 16 as well as transversely of the truck, so as to brace the upright in two vertical planes at right angles to each other.

To the frame 15 is bolted, as at 52, a bearing bracket 22 which has a forwardly extending arm 23 terminating with a bearing 24 for a vertical shaft 25. The bracket 22 is also provided with upwardly inclined arms 26 at the ends of which are formed bearings 27 for a horizontal shaft 28, and a transverse brace 29 connects the two bearings 27 and has a second bearing 30 for the vertical shaft 25, as best seen in Figure 3.

At the upper end of the vertical shaft 25 is rigidly mounted a bevel gear 31 in mesh with the pinion 32 secured on the horizontal shaft 28, which at one of its free ends carries a double pulley 33 arranged to connect by means of a belt 34 with the double pulley 9 carried on the main shaft 14 of the motor.

Below the bearing bracket 22 is to be found a gear case 35 consisting of two mating sections 36 and 37 joined together by means of annular flanges 38 and 39 forming a gear chamber 40 between them. Into this chamber, the vertical shaft 25 extends supported in the casing section 36, as best seen in Figure 4, and at the end of the shaft 25 is secured a miter gear 41 meshing with one side of the double miter gear 42 carried loosely on the cross shaft 43 which extends in horizontal direction through the bearing portions 44 and 45 on the casing sections 36 and 37 respectively, the ends of the shaft 43 being threaded to receive nuts 46 drawing the two sections together. The ends of the bearing portions 44 and 45 are preferably provided with caps 47 which are suitably arranged to contain lubricating matter for supplying the same to the shaft 43 and the gears contained in the casing.

In the casing is also carried a third miter gear 48 meshing with the other side of the double miter gear 42 so that the horizontal shaft 49, upon which the miter gear 48 is rigidly mounted will revolve with the same speed as the vertical shaft 25. The horizontal shaft 49 extends through the gear casing 35 in forward direction and is yieldably supported by means of a tension spring 50 suspended from the arm 17, its lower end engaging in a bearing sleeve 51 held in position between washers 53 on the shaft 49 so that the latter can rotate within the bearing sleeve 51. The shaft 49 is of square cross section at 54 and has telescopic engagement with the coupling shaft 55, thus communicating rotation to the coupling shaft whenever the motor is running.

At the forward end of the coupling shaft 55 which is preferably of square cross section, is slidably mounted the muff 56 of a friction coupling. At this end the coupling shaft 55 has a smooth cylindrical bore, in which the gear shaft 57 is mounted to rotate. Upon this gear shaft is rigidly secured a cone 58 adapted to engage within the muff 56, and the conical surface of either or both of the coupling members may be lined with suitable material 59 for increasing the friction between them.

The gear shaft 57 is mounted in a gear casing 60 which is an exact counterpart of the gear casing 35 already described, and the shaft 57 carries a miter gear 61 meshing with one side of the double miter gear 62 revolubly mounted on the cross shaft 63 securing the two gear case sections together as already described. The other side of the double gear 62 meshes with a miter gear 64 also enclosed in the chamber formed in the gear casing 60. This last miter gear 64 is secured on a vertical shaft 65 extending downwardly from the gear casing and carrying at its lower end the auger head 66. The cups 67 threaded over the ends of the gear casing are, in this case, shaped as handles 68 for manipulating the auger head 66.

Upon the rear end of the gear case 60 is formed a short hub 69, through which the gear shaft 57 runs. Around this hub is secured a frame 70 having two rearwardly depending shanks 71, upon one of which is pivoted the coupling lever 72 extending across the other shank and terminating with a handle 73. The handle is preferably held down on the shank by means of a strap 74 which may have ratchet teeth for holding the lever in set position. In the middle of the coupling lever 72 is formed a loop 75, into which the rear end 76 of the muff 56 extends, the muff being, at this place, provided with a groove 77, in which two halves of the gripper 78 engage, the gripper having trunnions 79 pivoted in the loop 75.

The auger head 66 is preferably provided with several blades, one of which being hinged and connected by means of a link 81 with a lever 82, by means of which the blade 80 may be swung outwardly to open and discharge material from the head.

As the gear casing 35 is supported on the vertical shaft 25, it will be evident that the shaft 49, together with the auger head 66 and all intermediary parts may be swung in a horizontal plane around the axis of the shaft 25. The raising and lowering of the auger head will take place around the axis of the horizontal shaft 43, and the swinging of the auger head 66 can take place in all directions around the axes of the horizontal shafts 63 and 57 or 49.

The operation of the auger takes place in the following manner. In accordance with the speed at which the auger is intended to be rotated, the belt 34 is placed on the larger or smaller step of the pulley 9, whereupon the motor 11 is started in the usual manner. The shaft 49 together with the muff 56 will now start to rotate as actuated by the bevel gears 32 and 31, and the miter gears 41, 42 and 48. As soon as the operator has placed the auger head in the proper position on the ground, whether in inclined or perpendicular direction, or swung to one side of the truck, or placed in longitudinal direction thereof, the auger head is then started to rotate as soon as the coupling lever 72 is drawn towards the gear casing 60, when the muff 56 will engage with the beveled surface of the cone 58, thus starting the miter gears 61, 62 and 64, which actuate the auger head.

Having thus described the invention, what is claimed as new is:

1. In a boring tool, the combination with an auger with a revoluble spindle and a motor therefor; of a frame, a bracket secured thereon, a vertical shaft, bearings on said bracket for said vertical shaft, driving connection between the motor and the vertical shaft, and suitable transmission between the vertical shaft and said auger head permitting swinging and raising of said head in vertical planes, while the positioning of said head in horizontal planes takes place around the axis of said vertical shaft; said transmission including a pair of similar gear casings, one of said gear casings carried at the end of said vertical shaft and the other at the end of said auger spindle, and positive driving connection between said gear casings.

2. In a boring tool, the combination with an auger with a revoluble spindle and a motor therefor; of a frame, a bracket secured thereon, a vertical shaft, bearings on said bracket for said vertical shaft, driving connection between the motor and the vertical shaft, and suitable transmission between the vertical shaft and said auger head permitting swinging and raising of said head in vertical planes, while the positioning of said head in horizontal planes takes place around the axis of said vertical shaft; said transmission including a pair of similar gear casings, one of said gear casings carried at the end of said vertical shaft and the other at the end of said auger spindle, telescopic shafting between said gear casings, and a train of gears and a transverse shaft in each of said casings making positive connection between said telescopic shaft and said vertical shaft and auger spindle respectively.

3. In a boring tool, the combination with an auger with a revoluble spindle and a motor therefor; of a frame, a bracket secured thereon, a vertical shaft, bearings on said bracket for said vertical shaft, driving connection between the motor and the vertical shaft, and suitable transmission between the vertical shaft and said auger head permitting swinging and raising of said head in vertical planes, while the positioning of said head in horizontal planes takes place around the axis of said vertical shaft; said transmission including a pair of similar gear casings, one of said gear casings carried at the end of said vertical shaft and the other at the end of said auger spindle, telescopic shafting between said gear casings, a coupling, and a train of gears and a transverse shaft in each of said casings making positive connection between said telescopic shaft and said vertical shaft and auger spindle respectively.

In testimony whereof I affix my signature.

RICHARD W. PETERSON. [L. S.]